(12) United States Patent  
Leblanc

(10) Patent No.: US 7,708,317 B2  
(45) Date of Patent: May 4, 2010

(54) HOLLOW PIPE CONNECTOR

(75) Inventor: Alexandre Leblanc, Brossard (CA)

(73) Assignee: Alain Desmeules, Montreal, Quebec (CA)

( * ) Notice: Subject to any disclaimer, the term of this patent is extended or adjusted under 35 U.S.C. 154(b) by 471 days.

(21) Appl. No.: 11/520,597

(22) Filed: Sep. 14, 2006

(65) Prior Publication Data

US 2007/0296208 A1 Dec. 27, 2007

(30) Foreign Application Priority Data

Jun. 22, 2006 (CA) .................................. 2551252

(51) Int. Cl.
*F16L 21/00* (2006.01)
*F16B 7/00* (2006.01)
*E02D 5/08* (2006.01)

(52) U.S. Cl. .................. 285/31; 285/425; 403/292; 405/251

(58) Field of Classification Search ............. 403/292, 403/298, 294, 359.1, 359.6, 280, 293, 219; 285/31, 397, 913, 124.5, 124.4, 301, 425; 52/848, 849, 655.1, 653.1, 653.2; 446/105, 446/117, 111, 118, 120, 122, 125, 127; D08/354; 405/230, 231, 250, 251, 252; 312/265.1, 312/265.3, 265.4; 108/106, 107, 147.12, 108/147.13, 147.15
See application file for complete search history.

(56) References Cited

U.S. PATENT DOCUMENTS

| | | | | |
|---|---|---|---|---|
| 519,445 A * | 5/1894 | Cooper | ........................ | 52/154 |
| 674,752 A * | 5/1901 | Baker | ........................ | 403/52 |
| 832,711 A * | 10/1906 | Weber | ........................ | 52/855 |
| 1,037,147 A * | 8/1912 | Johnson | ........................ | 52/103 |
| 1,188,485 A * | 6/1916 | Pruyn | ........................ | 285/27 |
| 1,966,247 A * | 7/1934 | Janssen | ........................ | 242/130.3 |
| 2,081,893 A * | 5/1937 | Lozier | ........................ | 428/11 |
| 2,248,671 A * | 7/1941 | Hohl | ........................ | 52/480 |
| 2,337,461 A * | 12/1943 | Fuhr | ........................ | 16/422 |
| 2,627,192 A * | 2/1953 | Jenney, Jr. et al. | ........... | 72/41 |
| 2,633,662 A * | 4/1953 | Nelson | ........................ | 446/114 |
| 2,835,513 A * | 5/1958 | Pearson | ........................ | 285/222 |
| 2,850,304 A | 9/1958 | Wagner | | |
| 3,004,784 A * | 10/1961 | Selby | ........................ | 403/19 |
| 3,218,035 A * | 11/1965 | Dunlap | ........................ | 256/12.5 |
| 3,452,989 A * | 7/1969 | Jernstrom | ........................ | 273/276 |
| 3,532,369 A * | 10/1970 | Reilly | ........................ | 403/176 |
| 3,638,352 A * | 2/1972 | Christiansen | ............... | 446/120 |
| 3,650,553 A * | 3/1972 | Wennstrom | ................. | 403/282 |
| D224,507 S * | 8/1972 | Raynor et al. | ................ | D8/387 |
| 3,746,178 A * | 7/1973 | Wagschal | ................. | 211/74 |

(Continued)

*Primary Examiner*—Michael P Ferguson
*Assistant Examiner*—Jay R Ripley
(74) *Attorney, Agent, or Firm*—Ogilvy Renault LLP

(57) ABSTRACT

A hollow pipe connector is described for interconnecting opposed ends of two hollow pipes in abutting end-to-end relationship. Preferably, but not exclusively, the pipes are hollow pile cylinders of circular cross-section. The connector is formed by two flat metal plates each having interconnecting slots whereby the plates are coupled together to form a connector of X-cross-section. Each of the plates have outer side edges having opposed sloped edge portions on a respective side of an arresting raised projection formed in the outer edge in a mid-section thereof. The sloped edge portions slope inwardly towards a respective one of the opposed ends of the connector member. The connector engages opposed end portions of pipes coupled together by a frictional retaining force exerted on the inner walls at opposed ends of the coupled pipes.

5 Claims, 6 Drawing Sheets

U.S. PATENT DOCUMENTS

| | | | | |
|---|---|---|---|---|
| 3,748,795 A | * | 7/1973 | Berntsen | 52/98 |
| 3,796,055 A | * | 3/1974 | Mahony | 405/230 |
| 3,799,685 A | * | 3/1974 | Smith et al. | 403/298 |
| 3,844,124 A | * | 10/1974 | Tupper | 405/16 |
| 3,932,046 A | * | 1/1976 | Kawazu | 403/172 |
| 3,972,638 A | * | 8/1976 | Vivoli | 403/174 |
| D243,319 S | * | 2/1977 | Berntsen et al. | D10/74 |
| 4,049,355 A | * | 9/1977 | Kawazu | 403/172 |
| 4,065,220 A | * | 12/1977 | Ruga | 403/169 |
| 4,082,389 A | * | 4/1978 | Stewart | 312/258 |
| 4,088,414 A | * | 5/1978 | Fallein | 403/282 |
| 4,100,713 A | * | 7/1978 | Shoe | 52/655.1 |
| 4,110,949 A | * | 9/1978 | Cambiuzzi et al. | 52/437 |
| 4,114,883 A | * | 9/1978 | Fuscone | 473/586 |
| 4,119,283 A | * | 10/1978 | De Yarman | 244/153 A |
| D258,743 S | * | 3/1981 | Ruga | D21/484 |
| 4,378,028 A | * | 3/1983 | Weber et al. | 137/614.05 |
| 4,516,376 A | * | 5/1985 | King | 52/655.1 |
| 4,551,118 A | * | 11/1985 | Spisz | 464/182 |
| 4,551,960 A | * | 11/1985 | Fleishman | 52/655.1 |
| 4,607,974 A | * | 8/1986 | Brothers et al. | 403/24 |
| 4,665,943 A | * | 5/1987 | Medvick et al. | 137/543.17 |
| 4,673,308 A | * | 6/1987 | Reilly | 403/172 |
| 4,738,028 A | * | 4/1988 | Belokin et al. | 30/319 |
| 4,963,051 A | * | 10/1990 | Hutter | 403/298 |
| 5,097,645 A | * | 3/1992 | Sanderson | 52/655.1 |
| 5,390,463 A | * | 2/1995 | Sollner | 52/650.2 |
| 5,454,661 A | * | 10/1995 | Litvin et al. | 403/298 |
| 5,569,134 A | * | 10/1996 | Nordanger | 482/110 |
| D387,655 S | * | 12/1997 | Kopish | D8/382 |
| D390,807 S | * | 2/1998 | Otto | D11/121 |
| 5,741,102 A | * | 4/1998 | Everett et al. | 411/339 |
| 5,803,782 A | * | 9/1998 | Selton | 446/126 |
| 5,833,512 A | * | 11/1998 | Nicola | 446/114 |
| D409,677 S | * | 5/1999 | Jensen | D21/487 |
| 5,941,527 A | * | 8/1999 | Selton | 273/276 |
| 5,966,895 A | * | 10/1999 | Stecker | 52/850 |
| 6,186,855 B1 | * | 2/2001 | Bauer et al. | 446/104 |
| 6,493,917 B1 | * | 12/2002 | Sunka | 29/413 |
| 6,700,798 B2 | * | 3/2004 | Ribeiro | 361/804 |
| 6,857,247 B2 | * | 2/2005 | Adams | 52/656.9 |
| 6,882,696 B2 | * | 4/2005 | Nakayama et al. | 376/327 |
| 6,922,942 B2 | * | 8/2005 | Stefanutti | 47/47 |
| 7,069,703 B2 | * | 7/2006 | Colefax et al. | 52/677 |
| 7,273,404 B2 | * | 9/2007 | Kowalski et al. | 446/92 |
| 2004/0025426 A1 | * | 2/2004 | Stefanutti | 47/47 |
| 2004/0131419 A1 | * | 7/2004 | Hammond | 403/298 |

* cited by examiner

HOLLOW PIPE CONNECTOR

TECHNICAL FIELD

The present invention relates to a hollow pipe connector for interconnecting opposed ends of two hollow pipes, preferably but not exclusively, hollow steel pile cylinders, in abutting end-to-end relationship.

BACKGROUND ART

There are many types of pipe couplers known in the art of pipe coupling and the present invention is concerned with internal pipe couplers whereby to interconnect two pipes in end-to-end abutting relationship. An example of such a coupler is described in U.S. Pat. No. 2,850,304 wherein an internal expanding sleeve is located in opposed ends of two pipes placed in abutting end-to-end relationship and the coupler is in the form of channels with reversely turned flanges of arcuate form. A set screw is provided in the wall of one of the pipes and engages internally the bottom of the respective channels while the reversely bent flanges engage the inner surface of the pipe walls. With this type of device it is necessary to thread a bore in the side wall of one of the pipes adjacent an end thereof for receiving the set screw. Also, one of the channel members of the connector has a threaded bore which needs to be aligned with the set screw for connection thereto while the channel member is positioned inside the end of one of the pipes. This is a time consuming assembly and requires precision and skill to install. A further disadvantage of such connectors is that if the set screw becomes disconnected, the channel members inside the pipe would fall freely inside the pipe, particularly if they are disposed in a vertical or an angular relationship causing the pipes to be disconnected. Also, vibrations in the pipes can cause the set screw to loosen. Such a connector would not be desirable for interconnecting ends of piles which are driven into the ground by impact force, for example. Another disadvantage of such connector is that they utilise a connector consisting of two components plus a set screw. If one of these components or screw becomes lost then the connector cannot be assembled. This type of connector therefore is subject to human error.

US application 2005/0111920 A1 published on May 26, 2005 describes an apparatus and a method for installing segmented concrete pilings. The concrete pilings are interconnected together in end-to-end relationship by connecting rods. The concrete pilings are therefore provided with apertures and these connecting rods are positioned therein. This patent application is not concerned with interconnecting hollow pipes in end-to-end relationship by a connector capable of permitting the passage of liquid or loose flowable material therethrough from inside the pipes after the pipes are interconnected together or during a pile driving operation.

Another known method of interconnecting hollow pipes in end-to-end relationship is by welding the joint formed by the abutting pipe ends together. Accordingly, there is required the use of a welder person to effect this soldering operation which is a relatively slow and expensive process. Another known method is to connect a sleeve about the abutting pipe ends connecting both pipe ends together. This is not desirable when the pipes are used as pile cylinders which are driven into the ground surface as the sleeve would provide added friction with the soil during the pile driving operation and are subjected to damage. Such joints are not practical as they add too much friction to the outer surface of the pipes.

SUMMARY OF INVENTION

It is a feature of the present invention to provide a hollow pipe connector which overcomes the above-mentioned disadvantages of the prior art.

Another feature of the present invention is to provide a hollow pipe connector which is easy to assemble, fool-proof and easy to install in opposed ends of pipes to couple the pipes together.

Another feature of the present invention is to provide a hollow pipe connector for interconnecting two hollow steel pile cylinders in end-to-end abutting relationship and wherein the pipes are interconnected by the connector by a frictional retention force exerted on the inner wall surfaces of two pipes disposed end-to-end.

Another feature of the present invention is to provide a hollow pipe connector which is inexpensive to fabricate and which consists of few parts which are easy to package and which permits the passage of liquids or material inside the coupled pipes.

Another feature of the present invention is to provide a pipe connector plate for use in the assembly of a pipe connector formed by mating two of these plates together.

Another feature of the present invention is to provide a method of interconnecting hollow metal pile cylinders which are driven into ground to form piles.

According to the above features, from a broad aspect, the present invention provides a hollow pipe connector for interconnecting opposed ends of two hollow pipes in abutting end-to-end relationship. The pipe connector comprises a rigid connector member having at least two diametrically aligned wall sections. Each wall section has an outer side edge for friction fit in at least a part thereof inside an end of a hollow pipe. Each of the outer side edges has opposed sloped edge portions on a respective side of an arresting raised projection formed in the outer edge in a mid-section thereof. The sloped edge portion slopes inwardly towards a respective one of opposed ends of the connector member.

According to a further broad aspect of the present invention there is provided a pipe connector plate for use in the assembly of a pipe connector formed by coupling two of these plates in mating relationship. The pipe connector plate is a flat metal plate having opposed side edges having their mean longitudinal axis extending substantially parallel to one another. An elongated rectangular plate interconnecting slot extends along a central longitudinal axis of the plate from an end edge thereof to about mid-length of the plate. Each of the opposed side edges has opposed sloped edge portions on a respective side of an arresting raised projection formed in the outer edge in a mid-section thereof. The sloped edge portions slope inwardly towards a respective one of opposed ends of the connector plate.

According to a still further broad aspect of the present invention there is provided a method of interconnecting hollow metal pile cylinders which are driven into ground in an end-to-end abutting relationship. The method comprises the steps of driving a first one of the pile cylinders into the ground with a top end portion of the cylinder exposed above ground. A hollow pipe connector constructed in accordance with the present invention, is positioned in the exposed top end of the first of the pile cylinders with a portion of the pipe connector extending therefrom. An open end of a second pile cylinder is positioned over a free end portion of the connector portion extending from the exposed top end of the first pile cylinder.

The second pile cylinder is impacted over the first pile cylinder to cause the connector to project inside opposed ends of the first and second pile cylinders in friction fit therein to interconnect the first and second pile cylinders in abutting end-to-end relationship and to drive the interconnected pile cylinders into the ground.

BRIEF DESCRIPTION OF THE DRAWINGS

A preferred embodiment of the present invention will now be described with reference to the accompanying drawings in which.

DESCRIPTION OF PREFERRED EMBODIMENTS

Figure 1:
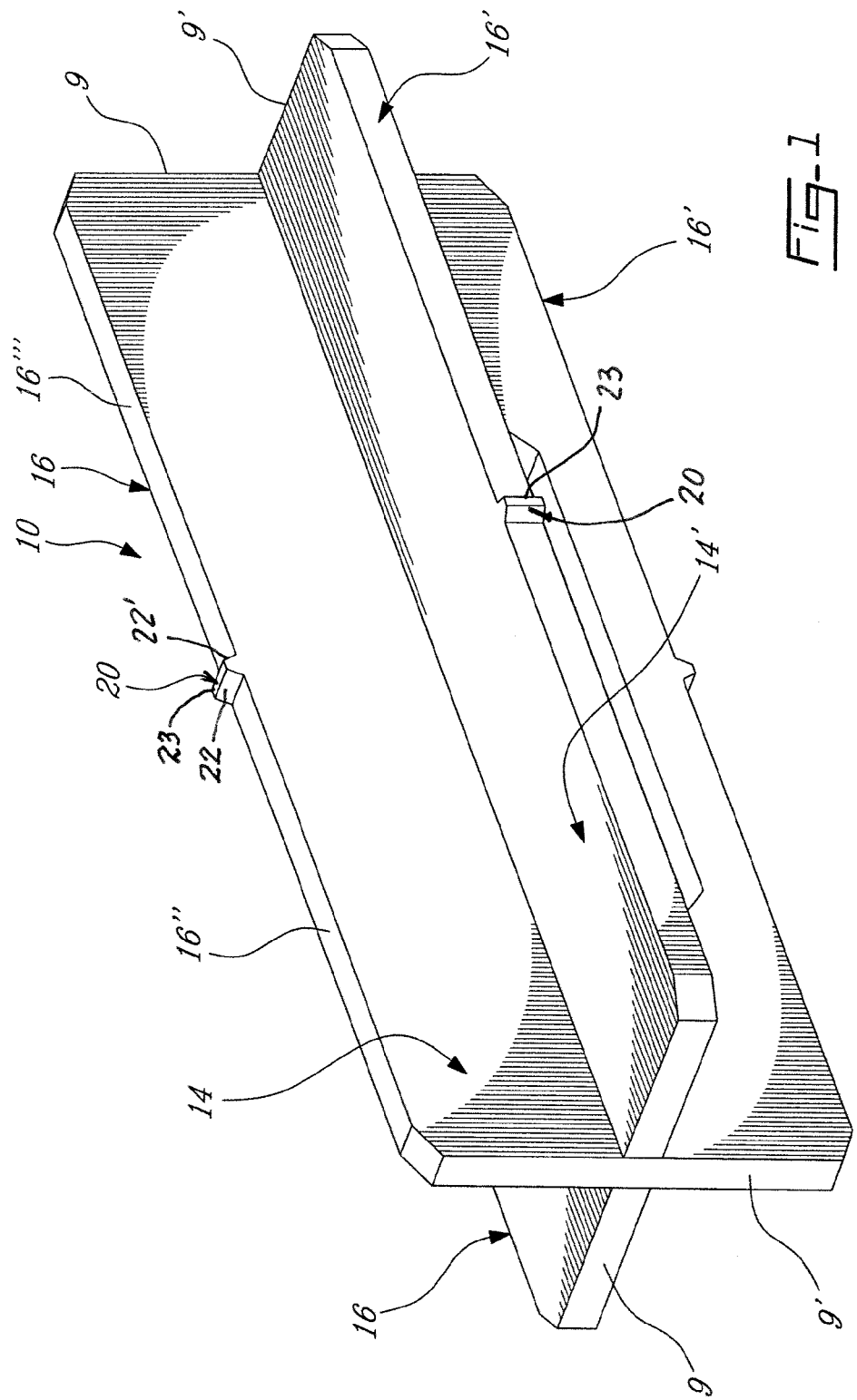
FIG. 1 is a perspective view showing the construction of the hollow pipe connector of the present invention.
Figure 2:
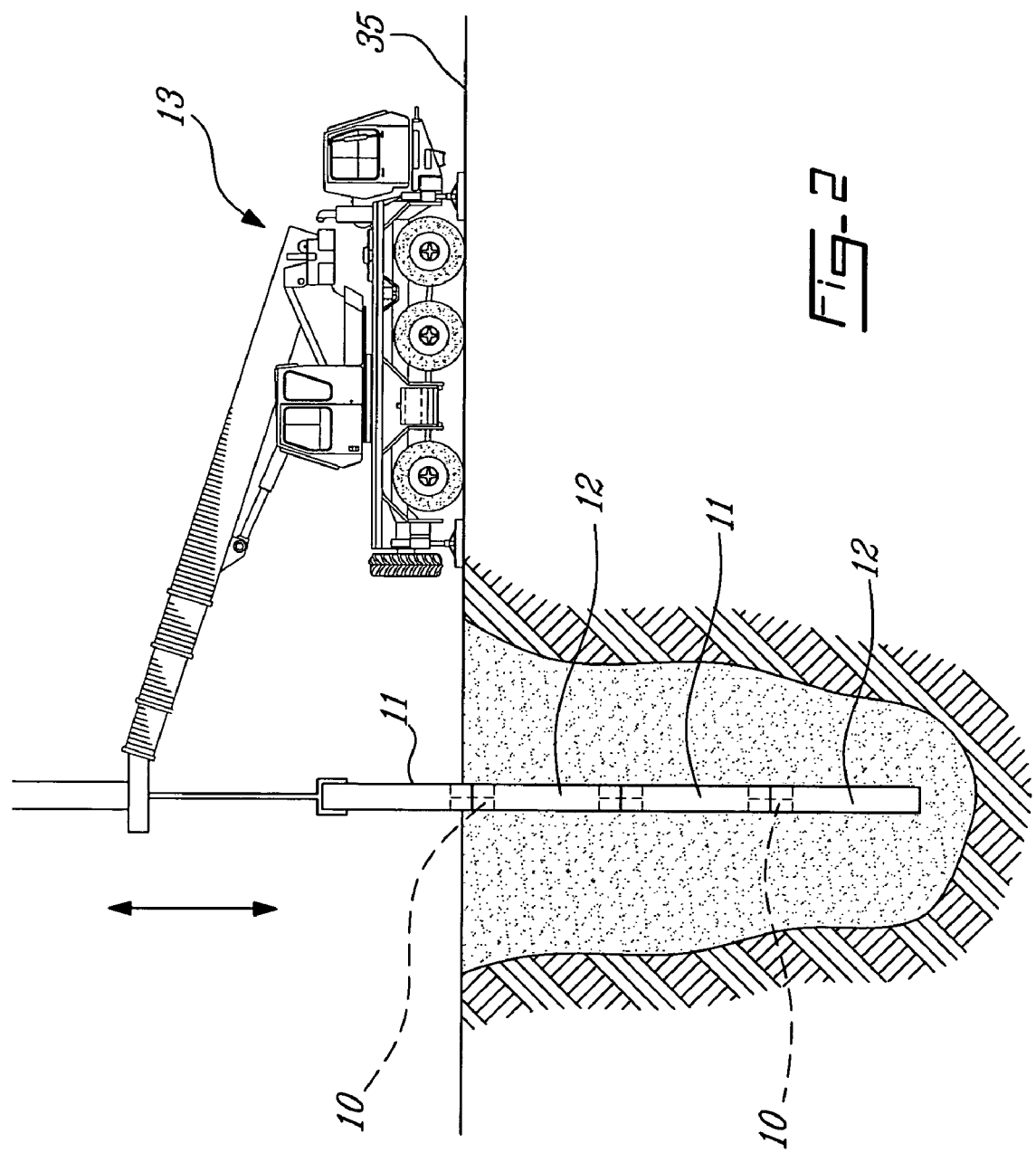
FIG. 2 is a schematic diagram showing a plurality of pile cylinders being driven into the ground by a pile driver and wherein the cylinders are interconnected end-to-end by the connector of the present invention.
Figure 3:
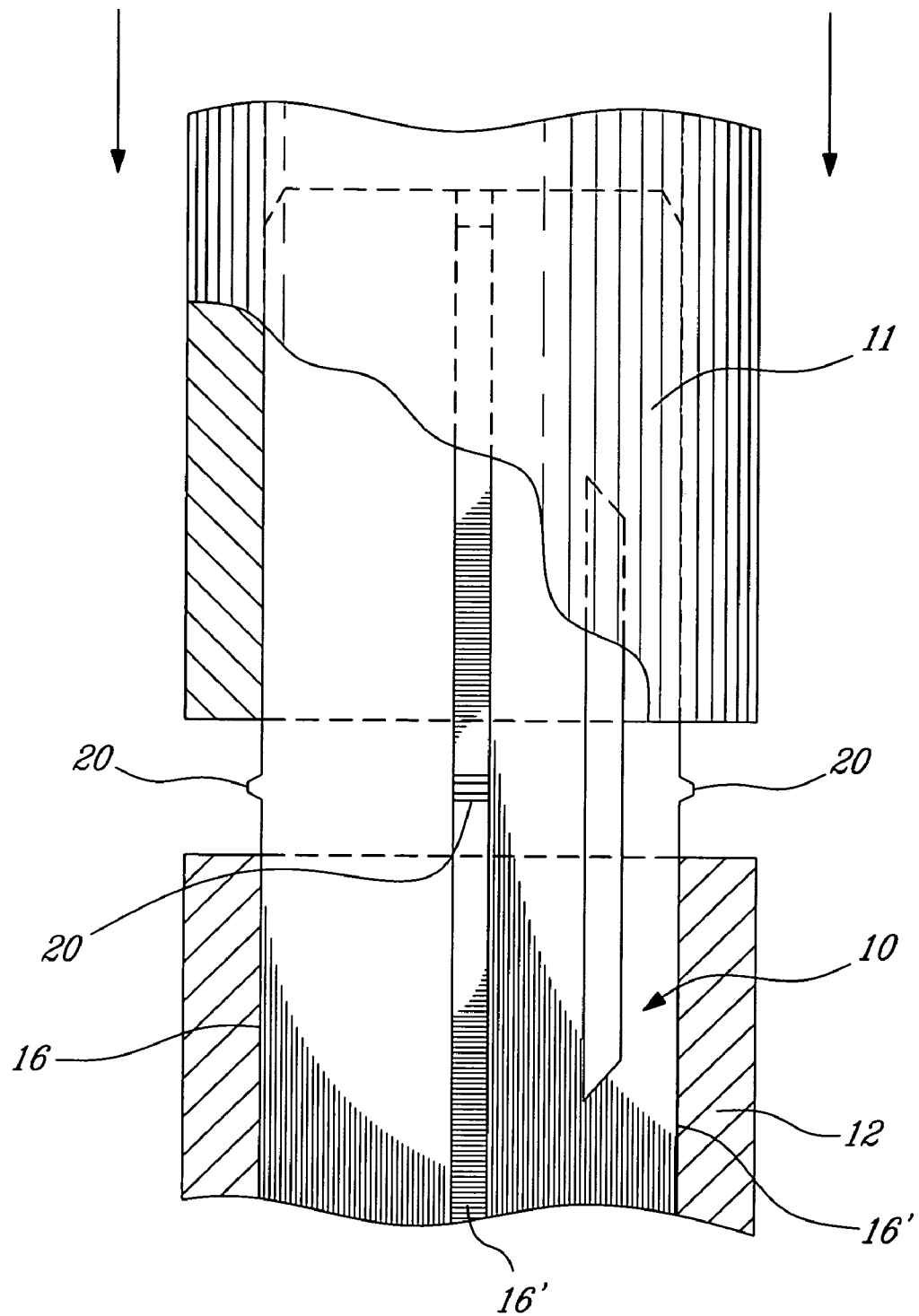
FIG. 3 is a fragmented, partly sectioned view, showing a hollow pipe connector set in position to interconnect two hollow pipes in abutting end-to-end relationship by the application of an axial force on one of the pipes.

Referring now to the drawings, more particularly FIGS. 1 to 3, there is shown, the pipe connector 10 of the present invention. The pipe connector is used for interconnecting opposed ends of two hollow pipes, such as the pipes 11 and 12, shown in FIG. 3, in abutting end-to-end relationship. FIG. 2 illustrates a plurality of these pipes which are herein pile cylinders driven into the ground and interconnected at their opposed ends by the hollow pipe connector 10 of the present invention. The interconnection is completed by the impact force exerted on the uppermost ones of the piles by the pile driving machine 13.

Figure 5:
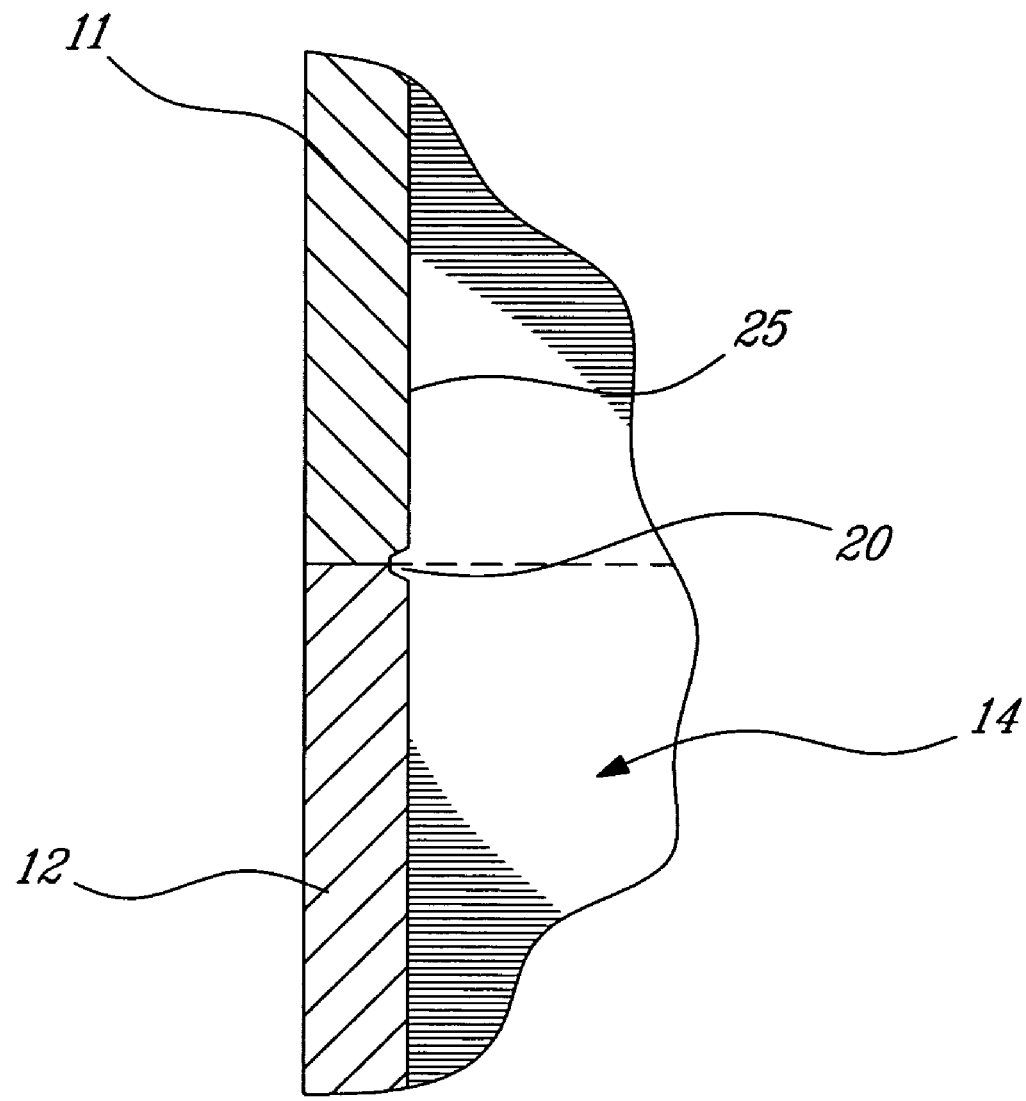
FIG. 5 is a fragmented section view showing the interconnected pipes in abutting end-to-end relationship with the position of the connector set therein and the arresting raised projection squished in the joint of the inner side walls of the interconnected pipes.

With additional reference now to FIGS. 6A and 7 there will be described the construction of the hollow pipe connector 10 as illustrated in FIG. 1. The connector 10 is formed by two pipe connector plates 14 and 14' of identical construction. As shown in FIG. 5 the pipe connector plate 14 is formed as a flat metal plate 15 which is provided with opposed side edges 16 and 16'. An elongated rectangular plate interconnecting slot 18 extends along a central longitudinal axis 19 of the plate 14 to about mid-length of the plate. The opposed ends 9 and 9' are straight parallel edges, but could have a different shape.

Each of the opposed side edges 16 and 16' have opposed sloped edge portions with a taper L of 0.0015 of an inch on each side of an arresting raised projection 20 formed in the outer edges 16 and 16' in a mid-section thereof, herein substantially at the center thereof. FIG. 6B is an enlarged view of circle portion "A" of FIG. 6A and illustrates this taper from the reference line 19' which is parallel to the longitudinal axes 19 in FIG. 6A. The sloped edge portions extend from this raised projection 20 and slope inwardly to opposed inwardly tapered end sections 21 and 21' at the four corners of the pipe connector plate 14. These tapered end sections 21 and 21' facilitate the positioning of the pipe connector in a free hollow end of the pipes.

The raised projection 20 is of substantially triangular shape and defines an apex 23 from which opposed sloped walls 22 and 22' extend to merge into opposed respective sloped edge portions 16" and 16'" of each side edges 16 and 16'. The pipe connector plate 14 is of a predetermined thickness which is usually selected to be of about the same thickness as the pipe thicknesses that they are intended to interconnect together. The opposed side edges 16 and 16' are also flat side edges.

Figure 4:
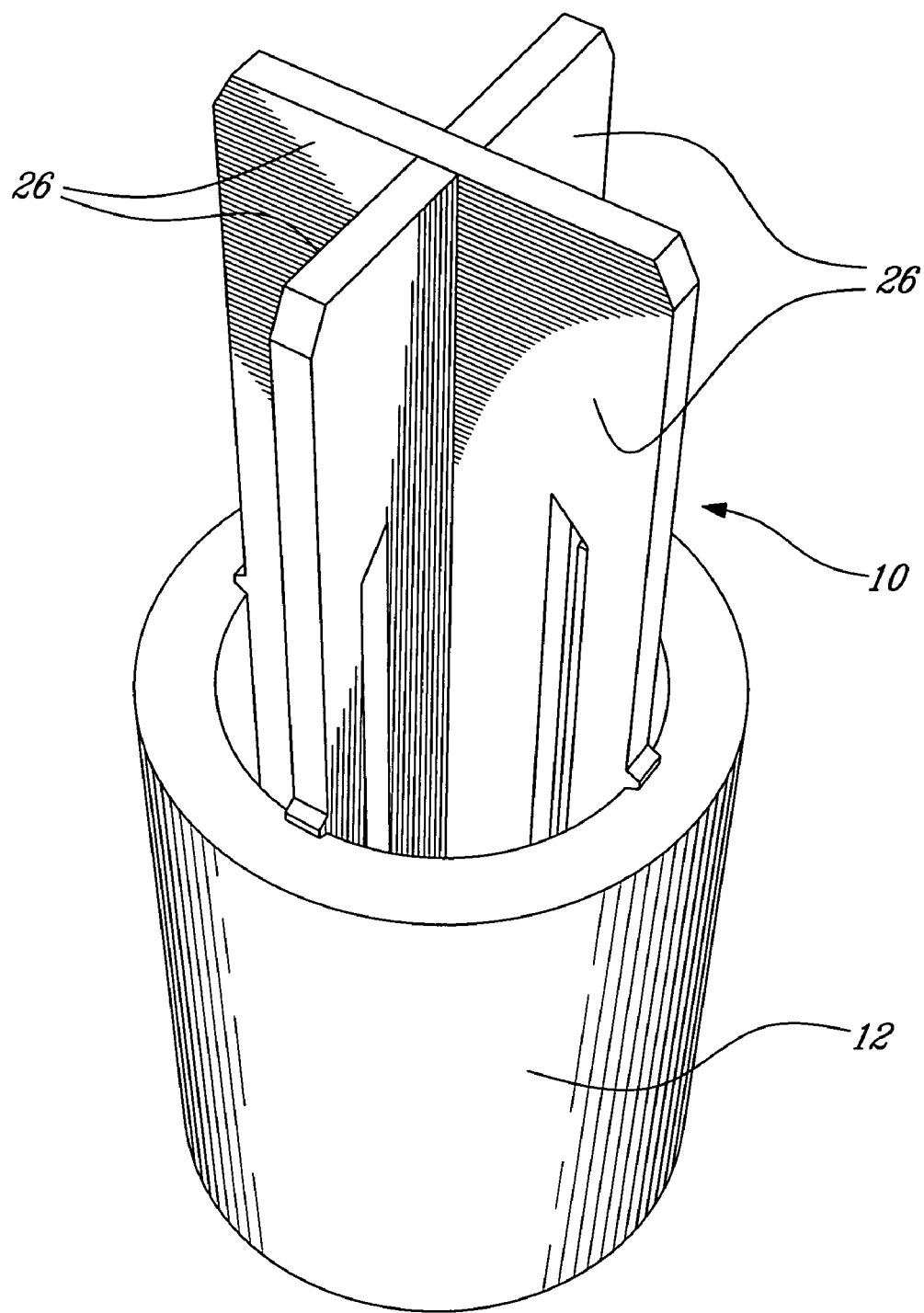
FIG. 4 is a further perspective view showing the hollow pipe connector of the present invention set in a free end of a hollow pipe of circular cross-section and projecting therefrom.
Figure 6A:
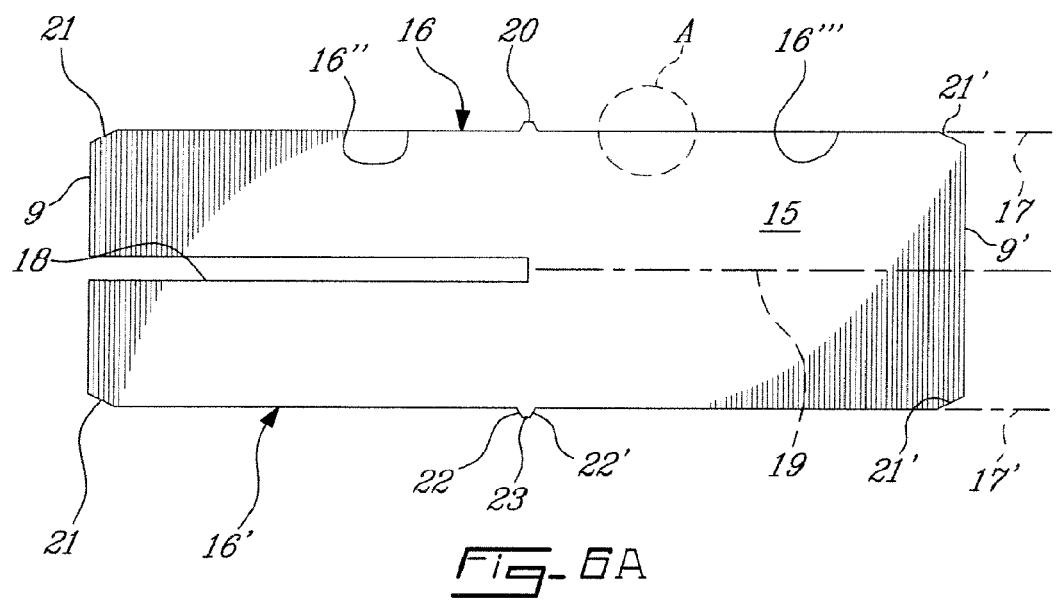
FIG. 6A is a plan view illustrating the construction of the pipe connector plate.
Figure 6B:
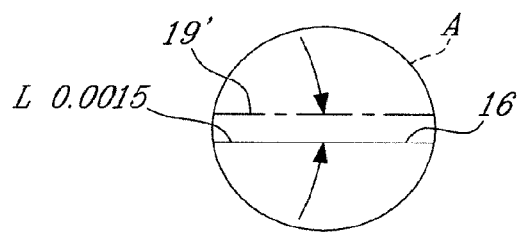
FIG. 6B is an enlarged view of the encircled portion "A" of one of the opposed side edges of the pipe connector plate shown in FIG. 6A.

As shown in FIGS. 6A and 6B, each of the tapered sections 16" and 16'" of the outer side edges 16 and 16' respectively taper by about 0.0015 inch exceeding an inner diameter of the two hollow pipes to be interconnected whereby to provide friction fit of the pipe connector with the inner wall 25 and 25' of the two pipes 11 and 12 to be connected together, as illustrated in FIGS. 3 and 5. As shown in FIG. 4, when two pipe connector plates 14 are coupled together in meshing or mating engagement, they are disposed at right angles to one another and form a pipe connector of X-cross-section with each of the wall sections 26, delineated by the flat plate sections on each side of the interconnecting slot 18, disposed at right angles to one another. It is pointed Out that conceivably the hollow pipe connector may consist of a single pipe connector plate 14 wherein to constitute two diametrically aligned wall sections each having their respective tapered outer side edges 16 and 16' in friction fit across the inner surface of a pipe ends. The raised projection 20 limits the insertion of the connector within each end of the pipes wherein the connector is extending substantially halfway in one pipe end and halfway in the other pipe end when the pipes are in abutment with one another.

Figure 7:
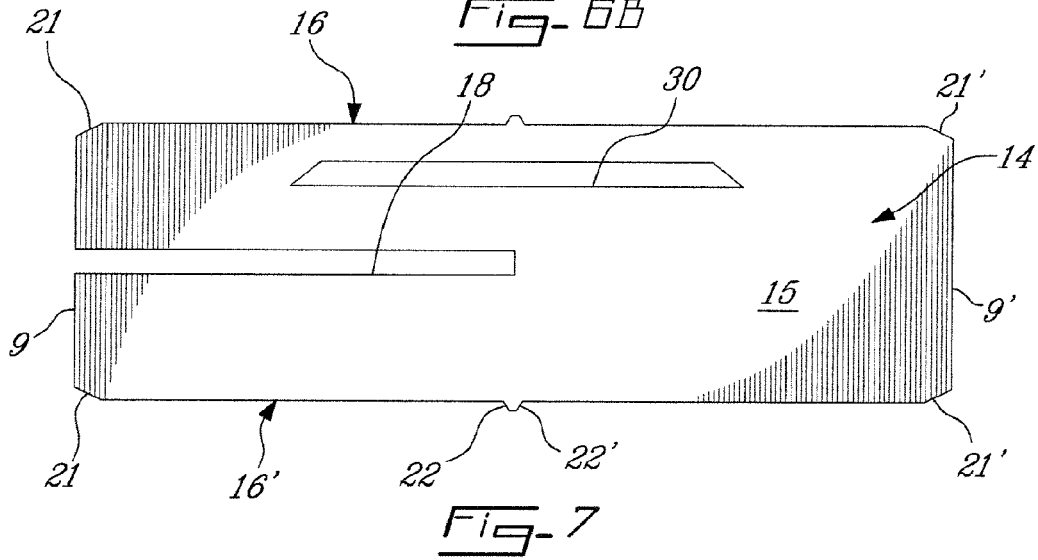
FIG. 7 is a plan view similar to FIG. 6 but showing the connector plate being provided with an elongated deflection slot disposed substantially parallel adjacent one of the outer side edges of the plate.

Referring now to FIG. 7, there is shown an elongated deflection slot 30 which is formed in the plate 14 and disposed spaced at least adjacent one of the outer side edges, herein edge 16, of the pipe 14. The deflection slot 30 extends substantially parallel to the edge 16. The purpose of this deflection slot is to permit slight transversal compression of the connector plate in its mid-section as the inner diameter of pipes always has a slight variation. The pile cylinders, to which these connectors were designed for use with, have an inner diameter that can vary within the range of +/−0.003 inch. This slot 30 provides a spring action transversely across the plate to accommodate these variations while preventing friction fit of the plates with the inner surface of the end sections of pipes interconnected together.

With reference to FIG. 2 there will briefly be described the method of interconnecting hollow pile cylinders together and driving them into a ground surface 35. The method consists of firstly driving a first pile cylinder 12' into the ground 35 with a top end portion of the cylinder remaining exposed above the ground surface. A pipe connector 10 is then positioned inside the top end of the first pile cylinder with a portion of the pipe connector extending therefrom. By the use of an impacting tool such as a hammer the connector is driven partly into the pipe end. A second pile cylinder is then placed over the top end portion or free end of the connector 10 extending from the top end of the first pile cylinder and the second cylinder is impacted over the first pile cylinder. This causes the connector 10 to project fully inside the first and second pile cylinders and in friction fit therein thereby interconnecting the first and second pile cylinders together in abutting end-to-end relationship and driving the interconnected pile cylinders into the ground.

It is within the ambit of the present invention to cover any obvious modifications of the preferred embodiment described herein, provided such modifications fall within the scope of the appended claims. For example, it is conceivable that the connector of the present invention could be fabricated from materials other than metal i.e. rigid plastics material whereby to interconnect the ends of hollow plastic pipes or any other pipes together. The connector can also be used to connect pipes of different cross-sectional configurations such as square-cross-sections. The taper of the opposed side edges of the connector plate can also vary when an elongated deflection slot is provided. These connectors also make it possible for concrete or water or other flowable material to be poured inside a plurality of pipes or pile cylinders driven into the ground as the connectors provide for the passage of such materials therethrough. The connector of the present invention can also be used in combination with an outer weld about the pipe joints whereby to provide increase retention force at the coupling ends of the pipes. Also, it is pointed out that pipes have imperfections on their inner walls due to their fabrication process and this connector can be placed in the end of a pipe whereby such imperfections are located in the space between opposed wall sections of the connector 10 not to interfere with the connector. Because the connector plates are identical, the assembly of the connector and its use does not require highly trained personnel.

I claim:

1. A pipe connector in combination with hollow solid metal pipes that form piles when driven into the ground, said pipe connector interconnecting opposed ends of two of said hollow slid metal pipes in end-to-end abutting relationship, said pipe connector comprising two flat solid plates of substantially rectangular contour and predetermined thickness, an elongated rectangular interconnecting slot in each said two flat solid plates extending along a central longitudinal axis thereof from an end edge of said plate to at least mid-length of said plate, said two flat solid plates being coupled to one another by mating said slots together, whereby said opposed ends of said plates are substantially aligned with said two flat solid plates disposed at right angles to one another, each said two flat solid plates having opposed flat outer side edges, an arresting raised projection extending outwardly from a respective one of said opposed flat outer side edges in a mid-section thereof, said arresting raised projections being transversely aligned with one another, each said flat outer side edges having opposed sloped edge portions extending from a respective side of said arresting raised projection and sloping inwardly to said opposed ends of each said two flat solid plates, said opposed sloped edge portions providing a friction fit connection in opposed ends of said two hollow solid metal pipes where said pipes are driven into the ground by an impact force with said pipe connector fitted between said opposed ends.

2. A pipe connector as claimed in claim 1, wherein said arresting raised projections have opposed sloped outer side edges merging to an apex of said arresting raised projection, said raised projection being disposed at mid-length of each said opposed outer side edges of said flat solid plate.

3. A pipe connector as claimed in claim 1, wherein said hollow metal pipes are steel pile cylinders of circular cross-section.

4. A pipe connector as claimed in claim 1, wherein each said two flat solid plates are further provided with an elongated deflection slot disposed spaced at least adjacent and parallel to one of said opposed flat outer side edges.

5. A pipe connector as claimed in claim 1, wherein each said opposed flat outer side edges have inwardly tapered end sections to facilitate positioning said pipe connector in said opposed ends of said two axially aligned hollow solid metal pipes, wherein the connector is extending substantially halfway in one pipe end and halfway in the other pipe end when the pipes are in abutment with one another.

* * * * *